No. 864,367.
PATENTED AUG. 27, 1907.
H. W. GALE & T. CROLL.
CHAFE IRON.
APPLICATION FILED JUNE 27, 1906.
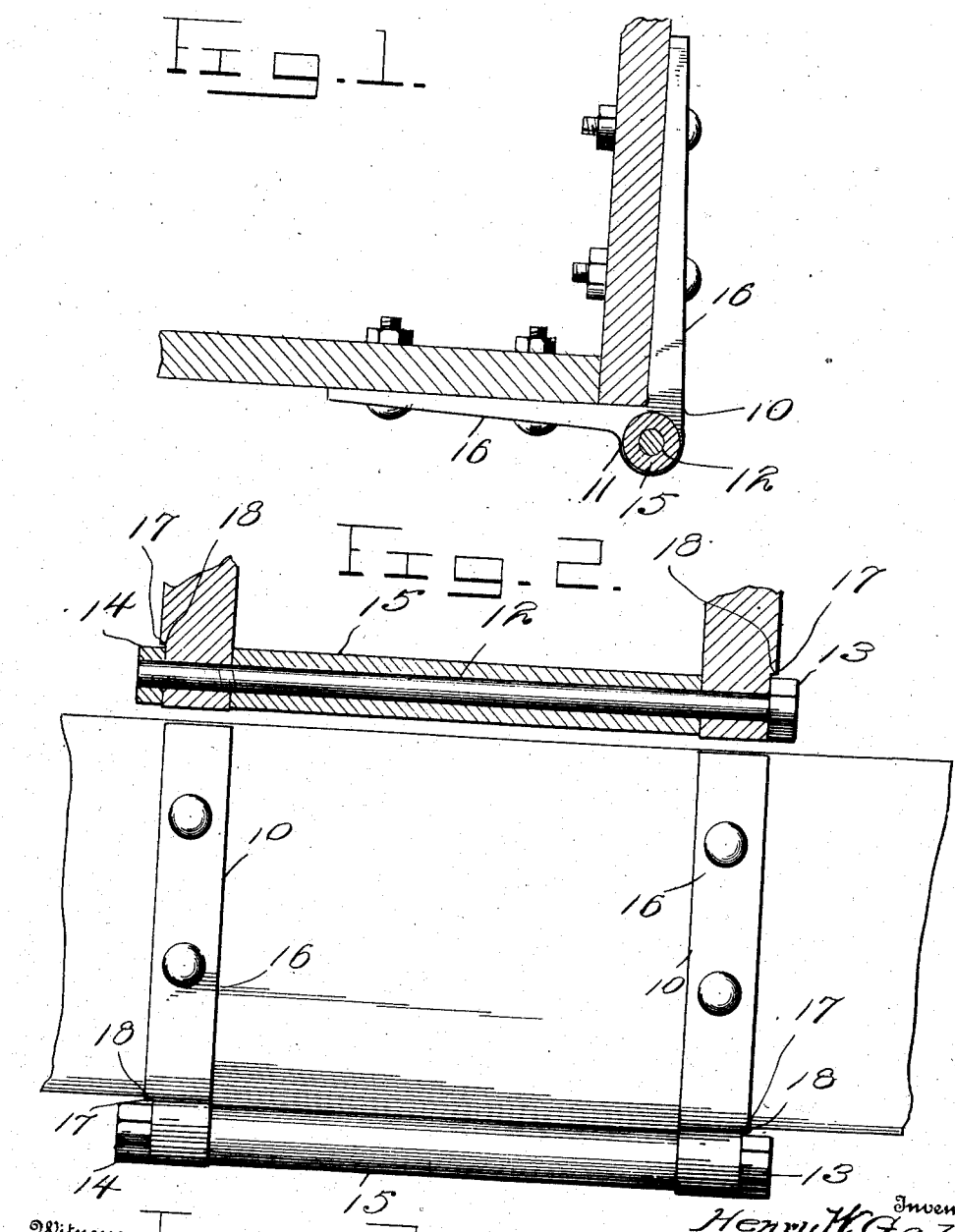

UNITED STATES PATENT OFFICE.

HENRY W. GALE AND THOMAS CROLL, OF MILLER, SOUTH DAKOTA.

CHAFE-IRON.

No. 864,367.  Specification of Letters Patent.  Patented Aug. 27, 1907.

Application filed June 27, 1906. Serial No. 323,726.

*To all whom it may concern:*

Be it known that we, HENRY W. GALE and THOMAS CROLL, citizens of the United States, residing at Miller, in the county of Hand, State of South Dakota, have invented certain new and useful Improvements in Chafe-Irons; and we do hereby declare the following to be a full, clear, and exact description of the invention, such as will enable others skilled in the art to which it appertains to make and use the same.

This invention has relation to what are commonly known as chafe irons for guarding the bodies of vehicles against wear and protecting them against mud being lodged upon them by the wheels in turning, when the tire is almost certain in all cases to rub against and chafe the lower corner of the vehicle body, rendering it unsightly and rapidly wearing it away; besides this, the wheel is liable to become cramped under the box or body and overturn the vehicle or do other damage.

It is the purpose of the present invention to provide a chafe or rub iron that will effectively guard and protect the vehicle body, and, by reason of its peculiar constructive character obviate any liability of the parts cramping with the resultant mischiefs mentioned.

It is also the object of the invention to provide a chafe-iron that will be durable in the highest degree, not only because of its substantial construction, but by reason of the reversibility of some of the parts, which practically doubles its lasting qualities.

The invention consists of novel parts, new combinations, and arrangement of parts, and the novelty of the device as a whole, all as is clearly shown in the annexed drawings, and as will be described in detail hereinafter and finally pointed out succinctly in the subjoined claims.

Of the said drawings, Figure 1 is an end view with the wagon box in section. Fig. 2 is a longitudinal section through the roller. Fig. 3 is an elevation of the invention in place.

Similar figures of reference designate similar parts or features, as the case may be, wherever they occur.

In the drawings, 10 designates the supporting irons of which there is one at each end of the complete device, and each of which is provided with a bearing 11 for the end of the pintle or rod 12, which is constructed as a bolt, provided on one end with a head 13, and screw-threaded at the other end for the reception of a nut 14, the said pintle passing through the bearings 11 of the support inside of the said nut 14 and head 13.

Between the bearings on the pintle is a rotary sleeve 15, in the form of a roller, against which the wheel of the vehicle comes in turning, and which constitutes the immediate protecting and anti-cramping means when the device is secured to the lower edge of the vehicle body, which is accomplished through the medium of the arms 16 that extend at right angles from the bearings 11. The said arms 16 have holes made through them for the reception of the shanks of the attaching screws, which are turned through or into the sides or bottom of the vehicle body or box, all as will be completely understood without further explanation.

At their outer sides the bearings or knuckles 11 are cut away slightly, as at 17, for the head 13 of the pintle or rod 12, on one side, and for the nut 14 on the other side. A shoulder or offset 18 is formed on each side of the cut-away part 17 against which the flat sides of the nut and head of the bolt bear, most of the time, and this constitutes a lock for the nut and bolt, so that it is not liable to turn off accidentally, and thus loosen the nut bolt and roller.

To cause the shoulders 18 to take over the head 13 and nut 14 and hold them in place, the parts will be adjusted before one or both sets of the angular arms 16 are secured to the body of the vehicles.

The device can be shifted from place to place, within the limits of its construction, so that when it becomes worn in too great a degree in one position it can be changed so as to bring a new point into place to receive the bearing of the wheel. Again the sleeve or roller 15 can easily be taken off and changed end for end to bring a new surface or line of bearing into place, and in this way greatly prolong the life or usefulness of the device.

Thus far the description has been directed to the attachment of the invention to plane or right angular corners of a wagon-body; it may, however, be applied to bodies or parts having a different shape, in the performance of the same function. In this case the only change that will be made will be in the form of the arms 16, that will be bent to suit the form or the surface on which they bear. For example, in its use on traction engines it may be secured to the boiler to protect it against wear or damage by the front wheels in short turns. Without changing the form of construction of the roller, the arms or brackets 16 may be curved, so as to fit on the boilers, and this change in shape may be made in other instances where circumstances call for it.

Other changes may be made in the form and arrangement of parts constituting the invention, within the scope of mechanical skill without departing from the general nature or spirit of the invention.

What is claimed, is:—

A chafe iron comprising in its construction a pintle, a sleeve roller thereon, supports consisting of the right-angular arms or brackets, provided at their angular points with bearings for the pintle, the latter having a head on one end, and the other end being screw-threaded and having a nut turned thereon, the said bearings being cut-away on their outer sides forming shoulders against which the head and nut on the pintle bear to lock them against turning.

In testimony whereof, I affix my signature, in presence of two witnesses.

HENRY W. GALE.
THOMAS CROLL.

Witnesses:
H. JAY COOKE,
JOHN PUSEY.